Sept. 12, 1961 P. M. HANKISON ET AL 2,999,509
DEVICE FOR AUTOMATICALLY VALVING LIQUID
Filed Dec. 12, 1956 2 Sheets-Sheet 1
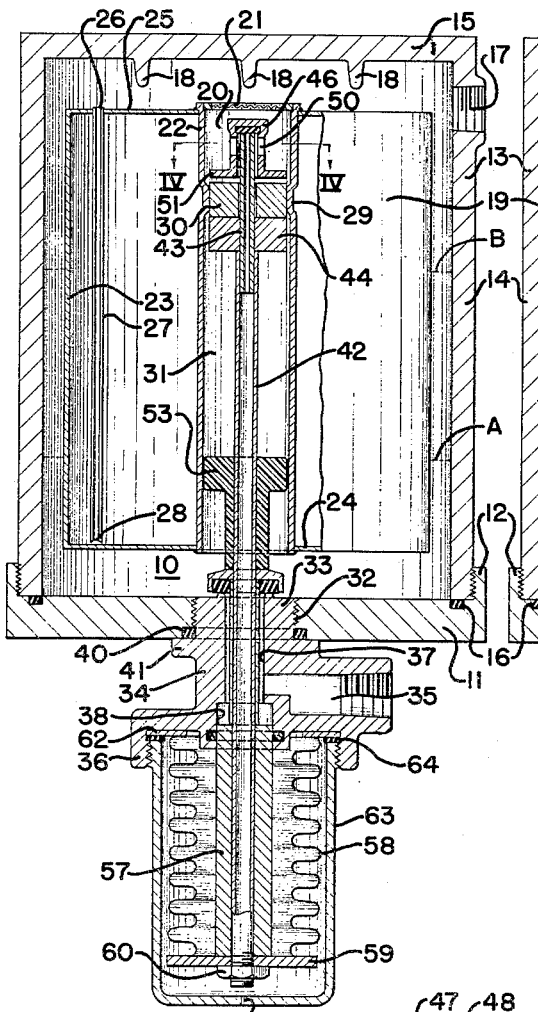
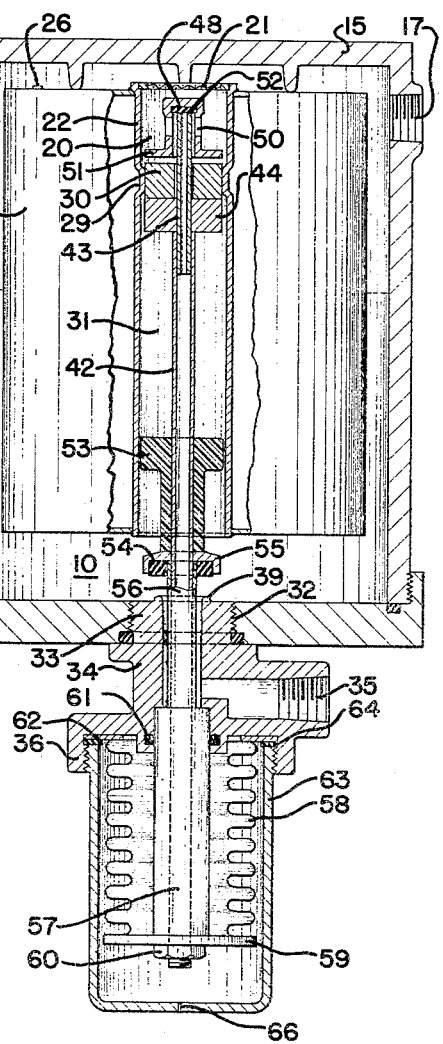
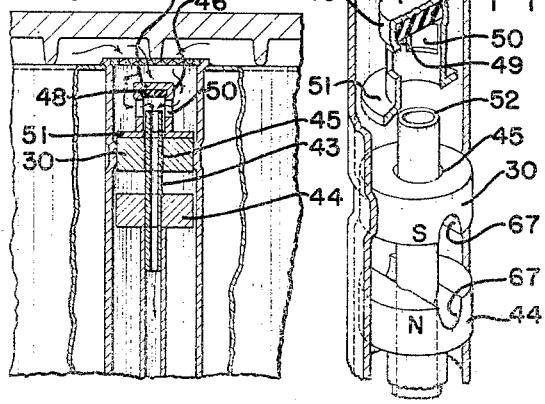
INVENTORS
PAUL M. HANKISON &
WILLIAM FOSTER WALKER
By Hoopes, Leonard & Buell
Their Attorneys

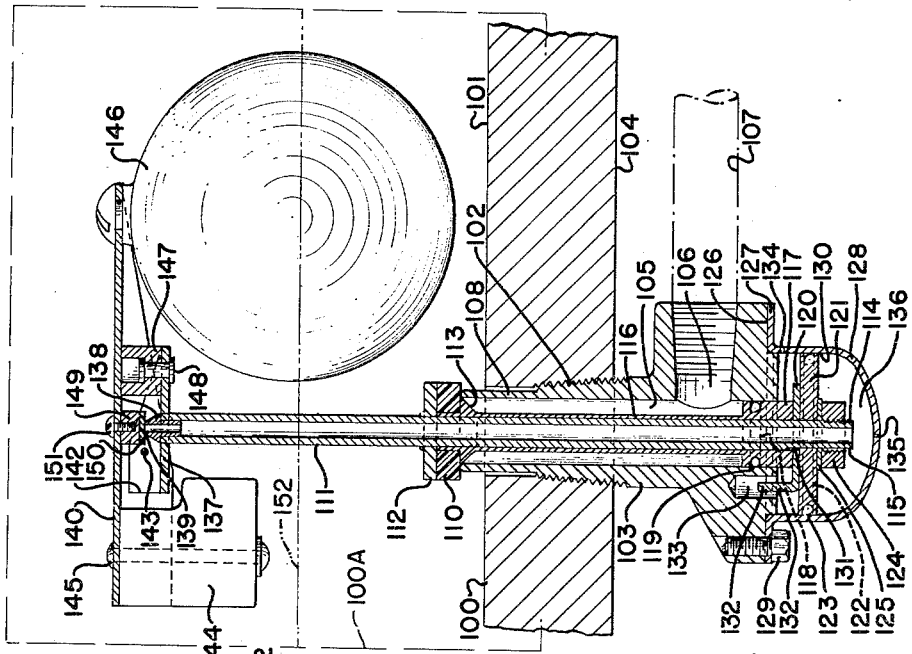

United States Patent Office 2,999,509
Patented Sept. 12, 1961

2,999,509
DEVICE FOR AUTOMATICALLY VALVING LIQUID
Paul M. Hankison and William Foster Walker, Bethel, Pa., assignors to Hankison Corporation, Pittsburgh, Pa., a corporation of Pennsylvania
Filed Dec. 12, 1956, Ser. No. 627,899
9 Claims. (Cl. 137—195)

This invention relates to a new relatively fast-acting means for automatically valving a liquid for trap discharge, liquid level control and other purposes, utilizing a float therein. More particularly, our invention relates to such new means embodying magnetic action and automatically actuatable by virtue of fluid force in the system to which such new means is applied.

Numerous prior devices of different kinds have been provided for the discharge of condensate or other liquid from traps used for manifold purposes in industry and otherwise, for regulating the height of liquid in industrial vessels, receivers, in household tanks including toilet tanks, and elsewhere, either by way of intake or discharge, as the case may be, when the liquid surface reached a preselected level, or by way of maintenance of such a level if the liquid surface tended to vary therefrom, by use of float operators, diaphragms, and spring members, both balanced and unbalanced. Recurring problems with such prior practices have included undesirable size or complexity of equipment, unwanted duration and velocity of liquid flow therethrough, clogging and other difficulties or failures in service, and in some cases the presence of an unsafe operating position in the event of failure whereby economic loss or hazard would result. A further difficulty in some prior practices arose out of attempts to utilize pressure in the system to operate a device with the required certainty or precision and particularly where relatively smaller orifices and/or higher velocities were prescribed or found.

Such deficiencies of prior devices are overcome by structures made in accordance with our invention for such uses respectively. Thus, our devices for automatically valving liquid, in a system under pressure, utilize that pressure automatically to actuate a main valve relatively quickly after, and only after, that liquid is at a relatively precisely predeterminable height. A device made in accordance with our invention is relatively quiet in operation and is preferably biased "safe" so that the possibility of the escape of material quantities of compressed fluid such as air or gas from the pressure system is avoided. Devices of the new kind disclosed by our invention have relatively few moving parts with relatively longer life and freedom from operating difficulty and drawbacks such as unwanted chattering or fluttering in service. Relatively fast and precisely predeterminable action is obtainable with the cooperation of magnets, preferably permanent, with provision for sufficient liquid orifice upon opening and closing to inhibit detrimental higher liquid velocities and clogging possibilities due to sludge and sediment.

Other objects and advantages will be apparent from the following description and from the accompanying drawings, which are illustrative of only two of the possible embodiments, in which FIGURE 1 is a view in elevation and section of one embodiment of this invention utilizable as a condensate trap shown in a normally closed position for such embodiment;

FIGURE 2 is a partial view in elevation and section showing a pilot valve in the embodiment of FIGURE 1 in position to cause the opening of the new device to discharge condensate therefrom;

FIGURE 3 is a view in elevation and section of the embodiment shown in FIGURE 1 with the pilot valve reclosed and the liquid discharge valve open and being biased toward closed position;

FIGURE 4 is a view in section taken along line IV—IV of FIGURE 1;

FIGURE 5 is a perspective view in section and somewhat enlarged of the pilot valve end of the new embodiment shown;

FIGURE 6 is an elevational view in section of a further embodiment of this invention shown in its normally closed position;

FIGURE 7 is a view similar to that shown in FIGURE 6 with such further embodiment having opened to discharge liquid from the system to which it is attached; and FIGURE 8 is a detail view taken along line VIII—VIII of FIGURE 7.

Referring to FIGURES 1 to 5 of the drawings, the embodiment of this invention therein illustrated may include a liquid receiver 10 having an annular base 11 with an internally threaded cylindrical flange 12 to receive an upper portion 13 of such receiver, such upper portion comprising cylindrical outer sides 14 and a circular top 15. A circular seal 16 is provided between portions 11 and 14 to make the interior of receiver 10 liquid tight and pressure tight. Wall 14 may be provided with an inlet opening 17 having suitable fittings through which liquid may enter receiver 10 under whatever pressure there may be in the system to which the new device is attached. Thus, in the case of condensate from the interior of gas pipeline systems such condensate will be under considerable pressure even when it has run into receiver 10, the balance of the receiver not occupied by liquid and equipment being filled with such gas. Such gas may instead be compressed air where a new device of this invention is applied to remove water condensate from compressed air lines and equipment.

Top 15 may be formed with a plurality of circumferentially spaced downwardly extending stops 18 to limit the possible upward movement of a hollow cylindrical and annular float 19 and afford access at all times by gas in such system to the upper central space 20 of float 19 through a screen 21 affixed around its edge to inner wall 22 of that float, the screen 21 removing any dirt or other particles entrained in such gas. Float 19 is also provided with a cylindrical outer wall 23, a bottom 24 extending between the inner and outer wall to seal the bottom of float 19.

A cover 25 similarly seals the top of float 19 between the inner and outer walls save for a vent 26 at the top of a vent tube 27 extending to a position close to the bottom of the inside of float 19. The interior of float 19 is in communication with the bottom of vent tube 27 through a vent opening 28 whereby the interior of float 19 is equalized as to ambient gas pressure in receiver 10 and is self-purging in the course of pressure differences should any liquid happen to get into such interior of float 19. As shown, inner tubular wall 22 is inwardly crimped at 29 to secure an upper magnet 30, preferably permanent, in fixed relation to float 19. Magnet 30 divides the space inwardly of inner wall 22 into said upper central space 20 and a lower central space 31 below magnet 30.

A central opening 32 in annular base 11 is threaded for the reception of an externally threaded hollow cylinder 33 which may be an integral part of a condensate discharge valve body fitting 34 having a liquid outlet 35 for condensate and a downwardly extending internally threaded cylindrical flange 36. A central bore 37 extends downwardly along the axis of fitting 34 including cylinder 33 and is widened at the lower end thereof in the form of a counterbore 38. Cylinder 33 is provided with an integral valve seat 39 extending continuously around the periphery of the upper end of bore 37. Packing 40 is interposed between base 11 and a flange 41 in fitting 34 to complete the sealing of the interior of receiver 10, to inhibit economic loss and/or hazard which might occur should any material quantity of a gas under pressure escape from a pressure system to which a new device of this invention might be attached.

A hollow valve stem 42 is provided and has a somewhat smaller diameter portion 43 at its upper end in pressed fit engagement with the upper end of the larger diameter portion of stem 42. Portion 43 is attached as by a press fit to a lower magnet 44, preferably permanent, and freely passes through a central opening 45 in upper magnet 30. Valve stem 42 normally projects upwardly and beyond magnet 30 a sufficient distance so that when our device is in a closed or non-liquid discharging position portion 43 will raise a pilot valve 46 away from magnet 30 and close the interior of hollow valve stem 42 around edge 52. Valve 46 may be constructed in a form of a cap 47 and provided with a flexible valve disc 48 of material like neoprene held as shown against the top of the inside of cap 47, the diameter of disc 48 being sufficient to engage and cover edge 52 when valve 46 is in closed position as shown in FIGURES 1 and 3.

The sides 49 of valve 46 are cut away to provide openings 50 around the periphery thereof, the aggregate area of openings 50 being sufficient to prevent any significant change in pressure between the inside and outside of valve 46 when gas begins to flow through the openings 50 into the interior of stem 42 as illustrated in FIGURE 2, thereby avoiding any tendency to "draw" liquid in receiver 10 up to the opened end of hollow stem portion 43. Lower annular flange 51 of valve 46 is preferably made of a magnetic material attractable by the adjacent magnetic force to enhance the quick closing of pilot valve 46 when stem portion 43 rises a sufficient distance above the upper surface of magnet 30 to permit edge 52 to engage disc 48 shutting off access to the interior of stem 42. It will be noted that in the illustrated embodiment, the limits of vertical movement of stem 42 are such that the edge 52 is always within the sides 49 of valve 46 in all of their relative positions.

A cylindrical guide bushing 53 which may be of a material like nylon encircles stem 42 in slidable relation thereto and to the inside of inner wall 22 in space 31. An annular discharge valve 54 fits around stem 42 and may be made of a suitable material such as nylon or neoprene to cooperate with seat 39 when valve 54 is closed against the passage of any fluid therethrough. A valve retainer 55 may surround and hold valve 54 and be brazed to stem 42. In this connection, it may be preferable to make at least movable parts of my new device including float 19 generally out of a corrosion-resistant material such as brass which is also non-magnetic.

A spacer sleeve 56 is provided to fit around stem 42, the actual diameter of sleeve 56 being sufficiently less than the diameter of bore 37 to provide a full flow outlet when valve 54 is opened through bore 37 through outlet space 45. It will be noted that when valve 54 is opened, as shown in FIGURE 3, the opening between the liquid valve and its seat and through bore 37 is of a sufficient size to avoid the creation of detrimental velocities such as might otherwise occur with openings that are just "cracked" or relatively too small for existing pressure and cause likelihood of undue erosion of parts and clogging in such small openings.

Sleeve 56 is preferably made of a harder metal such as Monel metal and its lower end abuts a plunger sleeve 57 which also extends around stem 42 and inside of bellows 58 to an end plate 59 closing the lower end of bellows 58. Plate 59 has an opening therethrough for the lower end of stem 42 which is threaded for the receipt of a nut 60 to secure stem 42 to plate 59 in spaced relation as shown, for the illustrated embodiment. The opening through plate 59 may also be threaded to engage the thread at the lower end of stem 42 in which event nut 69 acts as a lock nut fixing the position of plate 59 relative to stem 42. Since the combined length of members 56 and 57 determines the relative spacing of valve 54 along stem 42, by the selection of such members the correct adjustment is made possible when one such of our new devices is installed.

The upper end of plunger sleeve 57 slides in counterbore 38, an O-ring or other suitable packing 61 being provided therearound, while the joint between sleeves 56 and 57 completes the sealing off of the interior of bellows 58 from the liquid in receiver 10 being discharged through bore 37 and outlet 35.

Bellows 58 is preset or tempered to normally bias the parts of the new device shown to the closed position illustrated in FIGURE 1 until such time as liquid accumulates in receiver 10 to a sufficient extent to initiate the discharge of accumulated liquid therefrom. The other end of bellows 58 may be brazed to an annular flange ring 62. A cup-shaped casing 63 threaded at its upper end engages the threads of flange 36, a gasket 64 being interposed between the upper edge of casing 63 and flange 62 to seal the interior of casing 63 and hold flange 62 in position. Casing 63 is also provided with a small bleed opening 66 of smaller area than the opening through hollow valve stem 42.

In operation, let it be assumed that the illustrated embodiment of our invention is a condensate trap in a pipeline system through which gas under pressure is passing and that the liquid surface in receiver 10 is at the level A which would be sufficient to overcome the weight of float 19 and begin to open valve 54 were it not that the attraction of magnets 30 and 44 for each other which at that stage keep liquid valve 54 tightly closed against seat 39. Such magnets may respectively be made as shown in more detail in FIGURE 5 with a south and north pole respectively indicated by the letters S and N on each side of the respective gaps 67 or one such magnet may be used with the other being replaced by a like-shaped keeper of magnetic metal. Permanent magnets of such kind exert greater force for a given size and are suitable for use in a device in our invention. The lines of magnetic force also pass through flange 51 of pilot valve 46 to an extent which enhances its closing force against stem 42 particularly when inner wall 22, for example, is made of a non-magnetic metal like brass or other suitable non-magnetic metal.

Hence, even as the liquid surface in receiver 10, which usually will rise rather slowly, rises above level A, liquid valve 54 will remain tightly shut. However, when the liquid in receiver 10 reaches a predetermined level which may be designated B, preferably below the bottom surface of the lower magnet 44 because of possible rusting where the liquid is water, the magnetic attraction between magnets 30 and 44 is quickly broken and drops sharply as float 19 snaps up. In so doing the top surface of magnet 30 engages flange 51 and lifts it off end 52 of stem 42 so that gas under pressure, as shown in FIGURE 2, can rush down through the center of stem 42 and into the interior of casing 63 around the exterior of bellows 58. That gas pressure in casing 63 will exert an upward force on plate 59 and bellows 58 to quickly send it to the position shown in FIGURE 3 reclosing valve 46 and opening valve 54 to quickly drain all liquid in receiver 10 through the outlet 35. It will be realized that, if desired, the device may be constructed so that when main valve 54 opens it may move upwards a distance less than the space between the magnets with the result that the valve 46 will remain open until the level of the liquid in receiver 10 and thereby float 19 move a certain distance down from the top relative to stem 42 sufficient to reclose valve 46.

The opening movement of valve 54 is limited by the extent of movement permitted plunger 57 before it engages the shoulder at the top of counterbore 38. When the liquid is about completely discharged, valve 54 recloses aided by the bias exerted by bellows 58 when the pressure between the outside of bellows 58 and the inside of casing 63 is reduced sufficiently by bleeding off through bleed 66. Such quick relatively full opening and such quick closing of valve 54 not only guards against the escape of any material quantity of gas under pressure but renders our device also relatively quiet in action and it is automatic, operating as it does upon pressure energy in the system to which it is connected. It may happen also that liquid outlet 35 may in turn be connected to a pipe system having a valve therein which when shut off may tend to produce a so-called "hammer" effect back pressure exerted in a reverse direction through outlet 35. If such occurs, such back pressure force will also be operative to move our illustrated embodiment in a closing direction by acting against the top plunger 57 which is of greater diameter than that of seat 39.

Although the illustrated embodiment in FIGURES 1 to 5 has been described in terms of use as a trap, devices made in accordance with this invention may be used, for example, for many other purposes including the regulating of height of liquid in industrial and domestic tanks, in liquid receivers and controllers and by way of discharge when a liquid level reaches a predetermined height or by way of intake when the liquid level reaches a preselected level at which the higher level is to be restored, as will be evident to those skilled in the art to whom our invention set forth herein is disclosed.

A further embodiment of our invention is illustrated in FIGURES 6 and 7. Therein, a base or wall 100 of a pipe, receiver, enclosed vessel 100A or other part of a system in which liquid may collect along a surface 101 under pressure may be provided with a drilled and tapped opening 102 therethrough in which a valve body 103 of such further embodiment is screwed so as to make a tight sealed joint between the inside of the system accessible to surface 101 and an outside surface 104. The valve body 103 would preferably be mounted in a vertical position at the lowest point on wall 100 so that upon opening thereof as shown in FIGURE 7, a liquid against surface 101 would drain through a central bore 105 and outlet 106 into a discharge pipe 107 or other provision for receiving the liquid so discharged.

The operating principle of such further embodiment shown in FIGURES 6 and 7 is like that of the first described embodiment shown in FIGURES 1 to 5, inclusive. In the latter embodiment, the upper part of the valve body cylinder 108 is provided with an upper edge 109 serving as a continuous annular valve seat for a valve 110 which may be made in the form of a disc of material like neoprene. Valve disc 110 is positioned in a fixed location along a hollow valve stem 111 between a retainer 112 brazed or welded to stem 111 and a support flange 113 on the underside of disc 110, the outer peripheral edge of flange 113 terminating inwardly of the area of contact between disc 110 and edge 109 when main valve 110 is closed as shown in FIGURE 6.

The lower end of stem 111 is threaded at 114 and is provided on one side thereof with a "flat" portion 115. Flange 113 as shown is a shouldered part of a sleeve 116, the lower end of which engages the upper surface of a plunger block 117 having an annular recess 118 therein for the reception of an O-ring 119 to seal bore 105 below outlet 106. The lower end of plunger block 117 in turn abuts the upper side of a keying washer 120. The lower side of keying washer 120 abuts the upper surface of a piston plate 121 which also has an annular groove 122 for the reception of a sealing O-ring 123. A nut 124 and lock washer 125 complete the subassembly at the lower end of stem 111 and fix valve 110 in place by the engagement of the threads of nut 124 with threads 114.

The lower end of valve body 103 is provided with a peripheral seating flange 126 for engagement by a flange 127 of a casing 128, the casing being held to valve body 103 by a series of bolts 129 around the periphery at the joint between them.

The interior vertical wall 130 in casing 128 comprises a cylindrical bore for slidable engagement by piston plate 121. Moreover, keying washer 120 is provided with a flat 131 in the opening therethrough to engage flat 115 of stem 111 so that washer 120 cannot rotate relative to stem 111. An upturned projection 132 integral with washer 120 fits into a drilled opening 133 in valve body 103 in all positions of stem 111 to keep stem 111 from rotating relative to body 103. Casing 128 is provided with an upper vent opening 134 and a lower vent 135, the upper vent 134 serving to evacuate any superfluous fluid entering casing 128 above piston plate 121 while the lower vent 135 serves as a bleed for the relief of gas under presure entering chamber 136 through the interior of stem 111 in the course of an operation of the further embodiment.

The upper end of stem 111 is provided with a pivot arm 137 fixed thereto as by brazing or a press fit, the pivot arm being U-shaped in endwise appearance. A tip 138 drilled through the center is fitted in the upper end of tube 111 and secured thereto and has a pilot valve seat 139 at the upper end of tip 138. A float arm 140 which is in the shape of an inverted U when viewed endwise has skirts 141 positioned closely adjacent and outside the upstanding sides 142 of pivot arm 137. A pivot pin 143 extends between each such upstanding side 142 and the adjacent skirt 141 so that float arm 140 is pivotally connected to pivot arm 137 and thereby to stem 111. The material of which float arm 140 is made is magnetic material like steel. A counterweight 144 is fastened to float arm 140 by a rivet 145 on one side of the axis of the pivots 143 and is used to counterbalance a spherical float 146 depending from the other end of float arm 140. A permanent magnet 147 is fastened by a rivet 148 to pivot arm 137. Float arm 140 is connected to a pilot valve 149 faced with a resilient facing material 150 like neoprene to engage and close the seat 139 and thereby the pilot valve when the parts are in the position shown in FIGURE 6. Valve 149 is fastened to float arm 140 as by a screw 151.

In the operation of such further embodiment, liquid may rise, for example, up to a predetermined level 152 without upward movement of float 146 (and opening of pilot valve 149) because of the attraction of magnet 147 for float arm 140 as shown in FIGURE 6. Upon attainment of level 152 by such liquid, the device of FIGURES 6 and 7 will pop open because of the separation of magnet 147 from contact with float arm 140 causing the pilot valve 149 to leave seat 139, as shown in FIGURE 7. Gas under pressure above the surface 152 will rush immediately into the passage downwardly through the interior of hollow stem 111 as shown by the "wiggly" arrows in FIGURE 7 causing the gas to enter chamber 136 at a rate greater than it can be released therefrom by bleed vent 135. Thereby, the gas pressure exerted in chamber 136 will force the piston plate 121 upwardly practically instantly as also shown in FIGURE 7, opening the valve 110 by separating it from seat 109, whereby the accumulated liquid in contact with surface 101 will rush out (as shown by the arrows in the lower portion of FIGURE 7 with the relatively non-wiggly shafts), entering bore 105 and passing out through outlet 106. Such will cause float 146 to fall, closing pilot valve 149—150 and shutting off the flow of pressure gas to chamber 136, whereupon piston 121 will return to its lower position shown in FIGURE 6 closing valve 110, the gas in chamber 136 bleeding out through vent 135, until the liquid inside wall 100 again rises to the predetermined discharge level. Moreover, upon the occurrence of any liquid hammer reaction effect in pipe 107, such will not disturb the closure of valve 110 because of the construction of our new device.

Various modifications of our device as set forth in the illustrated embodiments may be made without departure from the spirit of our invention or the scope of our appended claims.

We claim:

1. In a trap device or the like for automatically discharging accumulated liquid, in combination, a pressure receiver for liquid subjected to the pressure of gas in a system, a pressure equalized self-purging float movably positioned in said receiver, said float having a tubular inner wall surrounding a vertical central space, a screen extending across said central space adjacent the top of said float, an annular permanent magnet fixed to said float in the upper part of said space, an annular main valve seat surrounding a liquid discharge bore communicating with the bottom of said receiver, the axis of said bore being coincident with the axis of said central space, an axially movable tubular valve stem extending freely through said bore and upwardly into said central space through a central opening in said permanent magnet, a pilot valve normally suspended on the top of said valve stem above said permanent magnet to close the tubular passage through said valve stem, means for admitting ambient gas under pressure to said passage through said valve stem when said pilot valve is raised above the end of said valve stem by vertical movement of said float and said permanent magnet, a bellows positioned below said bore and connected to the lower end of said valve stem, said bellows having its axis coincident with the axis of said valve stem passing through it, a casing surrounding said bellows in communication with said tubular passage through said valve stem, a bleeding opening in said casing, a liquid outlet communicating with said bore below said main valve seat, plunger means at the lower end of said bore to seal the interior of said bellows against the passage to liquid thereinto, a main valve mounted on said valve stem is fixed relation thereto to cooperate with said valve seat, said bellows being preset to bias said main valve to normally closed position on said seat, a spacer extending between said main valve and said plunger, and a permanent magnet fixed around said valve stem and movable therewith in said central space adjacent said first-named permanent magnet, whereby said float will not rise in said receiver until liquid therein is at a higher predetermined level capable of separating said magnets whereupon said pilot valve is opened by said float admitting gas under pressure into said casing to compress said bellows and open said main valve to discharge said liquid from said receiver and cause sequential reclosing of said pilot valve and of said main valve in readiness for the next automatic discharge action.

2. In a device for automatically valving liquid, in combination, a receiver for liquid accumulations from a gas pressure system, a float positioned in said receiver for vertical movement therein, said float further having a vertical central space and a permanent magnet fixed in the upper part of said space, a liquid discharge valve adjacent the bottom of said receiver in alignment with the axis of said central space, an axially movable tubular valve stem extending through said valve and upwardly into said central space, a pilot valve subject to magnetic attraction and normally suspended from the top of said valve stem adjacent said permanent magnet to close said tubular valve stem, means for admitting gas under pressure to the interior of said valve stem when said pilot valve is raised off the end of said valve stem by vertical movement of said float, a liquid outlet outside of said receiver and in communication with said liquid discharge valve, pressure operative means positioned below said liquid discharge valve and outlet and connected to the lower end of said valve stem which passes through said bellows, said pressure operative means being in alignment with said valve stem, a casing surrounding said pressure operative means in communication with the interior of said tubular valve stem, means to seal the interior of said casing against the passage of liquid thereinto, and a permanent magnet fixed to said valve stem in said central space sufficiently close to said first-named permanent magnet for the creation of magnetic attraction therebetween sufficient to hold down said float until the level of liquid in said receiver reaches a predetermined level higher than that normally required to move said float.

3. In a device for automatically valving liquid, in combination, a receiver for liquid, a float positioned in said receiver, a permanent magnet connected to the upper part of said float, a valve positioned adjacent the bottom of said receiver, an outlet for liquid outside said receiver and in communication with said valve, an axially movable hollow valve stem for said valve extending upwardly past said permanent magnet and downwardly past said outlet, a permanent magnet fixed to said valve stem adjacent said first-named permanent magnet to normally hold said float in descended position, pilot means cooperating with relative movements of said float and valve stem means to open the interior of said valve stem when said float moves upwardly and to close it when said float descends, fluid under pressure being admitted to said interior of said valve stem when said pilot means is opened, and pressure responsive means operatively connected to said valve stem below said valve responsive to such admission of fluid to move and operate said valve.

4. In a device for automatically valving liquid, in combination, a liquid holding member having a wall against which liquid collects under pressure, a main valve inside said base, a valve body having a seat for said main valve and extending through said wall for the periodical discharge of accumulated liquid, an outlet in said valve body for said discharge, a hollow valve stem extending through said wall and movable within said valve body, said main valve being mounted on said valve stem and movable therewith, a pilot valve on the liquid collecting side of said wall to open and close the top of said valve stem, a float adapted to engage said accumulated liquid, said float having an operative connection to said pilot valve, magnetic attraction means including a magnet operative between said hollow valve stem and said float to keep said pilot valve closed unless and until the level of said liquid reaches a predetermined height exerting a force upon said float sufficient to lift said float and overcome said magnetic attraction means, a cylinder in the lower end of said valve body on the outside of said wall, an annular piston fixed to said valve stem and having a passage communicating through said valve stem with the end of said cylinder away from said main valve, said piston adapted to be moved in said cylinder by the pressure of gas flowing through said valve stem to said end when said pilot valve is opened to open said main valve.

5. In a trap device or the like for automatically valving liquid from a liquid collector under pressure, in combination, a bottom wall in said collector against which liquid collects under pressure, a valve body extending through said wall in sealed relation thereto, said valve body having a central bore therethrough and an outlet in said valve body on the outside of said wall for the discharge of liquid so collected, the upper edge of said valve body forming a valve seat, a valve disc adapted to cooperate with said valve seat, a movable hollow valve stem fixed to said valve disc and extending through said valve disc and through said central bore, a piston plate connected to the lower end of said valve stem to raise and lower said valve disc, a cylinder chamber for said piston plate in a lower portion of said valve body outside of said wall, the interior of said valve stem being in communication through said piston plate with said chamber below said piston plate, a plunger block surrounding said valve stem and substantially closing said central bore below said outlet, means for preventing the rotation of said valve stem relative to said valve body, a pivot arm supportably connected to the upper end of said valve stem within said wall, a float arm pivotally connected to said pivot arm, a counterweight and a float respectively connected to said float arm on opposite sides of said pivot, a pilot valve connected to said float arm adapted to be opened and closed by movements of said float relative to said valve stem, the upper end of said valve stem providing a pilot valve seat to cooperate with said pilot valve, and a permanent magnet connected to at least one of said arms to normally magnetically attract said arms in a pilot valve closing direction, whereby when the level of liquid collecting inside said wall rises to a predetermined level above the level which would otherwise be required to lift said float, said float arm will be moved away from said magnet and open said pilot valve to permit pressure gas to enter said cylinder and move said piston plate in a valve disc opening direction for a discharge of such collected liquid.

6. In a device for automatically valving liquid, from a liquid collector under pressure in combination, a bottom wall in said collector against which liquid collects under pressure, a valve body extending through said wall in sealed relation thereto, said valve body having a bore therein and an outlet in said valve body for said bore on the outside of said wall for the discharge of liquid so collected, said valve body having a valve seat, a main valve adapted to cooperate with said valve seat, a movable hollow valve stem fixed to said main valve and extending through said valve and into said central bore, a piston plate connected to the lower end of said valve stem to raise said main valve, a cylinder chamber for said piston plate in a lower portion of said valve body, the interior of said valve stem being in communication through said piston plate with said chamber below said piston plate, a pivot arm connected to the upper end of said valve stem within said wall, a float arm pivotally connected to said pivot arm, a float connected to said float arm, a pilot valve connected to said float arm adapted to be opened by movement of said float arm away from the top of said valve stem to permit gas to pass through said stem and operate said piston plate in a main valve opening direction, the upper end of said valve stem providing a pilot valve seat to cooperate with said pilot valve, and a permanent magnet connected to at least one of said arms to magnetically attract said arms in a pilot valve closing direction, said valves being constructed and arranged to close following the respective openings thereof.

7. In an automatic valve trap or the like for an enclosure having a wall against which liquid accumulates under pressure, apparatus comprising, in combination, a valve body having a central passage in communication through said wall with said liquid, a valve seat adjacent the inside of said wall and fixed to the upper portion of said valve body, a movable hollow valve stem extending through and reciprocable in said central passage and having a valve stem passage therethrough, a main valve fixed to said valve stem adjacent said valve seat to cooperate therewith, a pilot valve seat on said valve stem adjacent the upper end portion of said valve stem passage, a magnet fixed to the upper portion of said valve stem, a float arm pivotally connected to said valve stem adjacent said pilot valve seat and said magnet, a float fixed to said float arm to be engaged by said liquid, a pilot valve fixed to said float arm to cooperate with said pilot valve seat and close said valve stem passage while said float arm is attracted by said magnet, a discharge outlet in said valve body for said liquid extending between said central passage and the outside of said wall, a main valve operating cylinder connected to said valve body in alignment with said central passage and adjacent the lower end portion of said valve stem, an annular pressure responsive member fixed to said valve stem and cooperating with said cylinder, and means for admitting pressure fluid from said hollow valve stem to the underside of said member to move it upwardly in said cylinder and open said main valve when said pilot valve snaps open under a force against said float sufficient to raise said float and overcome the attraction of said magnet for said float arm.

8. A device for automatically discharging liquid periodically from a pressure system, comprising in combination, a liquid accumulation chamber, an outlet from said chamber having a main valve opening and seat, an annular main valve adapted to normally close said main valve opening and seat, a hollow axially movable valve stem extending between said chamber and outlet through said main valve, said valve stem having a pilot valve opening and seat at the chamber end thereof and pressure responsive means at the outlet end thereof, a pilot valve normally closing said pilot opening and seat, said pressure responsive means adapted to be subject to pressure when said pilot valve is opened to move said valve stem and open said main valve, float means in said chamber operatively connected to the chamber portion of said valve stem and said pilot valve, and magnetic attraction means in cooperative relation to said valve stem and float means to normally operatively hold said float means and pilot valve in normally closed pilot valve relation until liquid in said chamber reaches a predetermined superbuoyancy level relative to said float means, whereby the force of said magnetic attraction means will be overcome in a snap action, snapping open said pilot valve and opening said main valve to discharge liquid from said chamber.

9. A device for automatically discharging liquid periodically from a pressure system, comprising, in combination, a liquid accumulation chamber, an outlet from said chamber having a main valve opening and seat, an annular main valve adapted to normally close said main valve opening and seat, a hollow axially movable valve stem extending between said chamber and outlet through said main valve, said valve stem having a pilot valve opening and seat at the chamber end thereof and pressure responsive means at the outlet end thereof, a pilot valve normally closing said pilot opening and seat, said pressure responsive means adapted to be subject to pressure when said pilot valve is opened to move said valve stem and open said main valve, float means in said chamber operatively connected to the chamber portion of said valve stem and said pilot valve, magnetic attraction means in cooperative relation to said valve stem and float means to normally operatively hold said float means and pilot valve in normally closed pilot valve relation until liquid in said chamber reaches a predetermined superbuoyancy level relative to said float means, whereby the force of said magnetic attraction means will be overcome in a snap action, snapping open said pilot valve and opening said main valve to discharge liquid from said chamber until said pilot valve is reclosed with said force reestablished, and further pressure responsive means at the outlet end of said valve stem operative to thrust said valve stem in a main valve closing direction upon said reclosing of said pilot valve.

References Cited in the file of this patent
UNITED STATES PATENTS

| | | |
|---|---|---|
| 779,772 | Donnelly | Jan. 10, 1905 |
| 1,738,809 | Walter | Dec. 10, 1929 |
| 1,745,762 | Honiss | Feb. 4, 1930 |
| 1,961,448 | Patterson | June 5, 1934 |

FOREIGN PATENTS

| | | |
|---|---|---|
| 589,617 | Germany | Dec. 11, 1933 |

UNITED STATES PATENT OFFICE
CERTIFICATE OF CORRECTION

Patent No. 2,999,509                      September 12, 1961

Paul M. Hankison et al.

It is hereby certified that error appears in the above numbered patent requiring correction and that the said Letters Patent should read as corrected below.

Column 7, line 31, for "bleeding" read -- bleed --; line 35, for "to" read -- of --; line 36, for "is" read -- in --; same column 7, line 70, for "bellows" read -- pressure operative means --; column 8, line 18, strike out "means".

Signed and sealed this 30th day of January 1962.

(SEAL)
Attest:

ERNEST W. SWIDER                      DAVID L. LADD
Attesting Officer                      Commissioner of Patents